(12) United States Patent
Russell

(10) Patent No.: US 11,968,216 B1
(45) Date of Patent: *Apr. 23, 2024

(54) METHODS AND SYSTEMS FOR MANAGING DELEGATES FOR SECURE ACCOUNT FUND TRANSFERS

(71) Applicant: UIPCO, LLC, San Antonio, TX (US)

(72) Inventor: Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,564

(22) Filed: Aug. 29, 2022

Related U.S. Application Data

(63) Continuation of application No. 16/728,062, filed on Dec. 27, 2019, now Pat. No. 11,489,842.

(51) Int. Cl.
| | |
|---|---|
| *H04L 9/40* | (2022.01) |
| *G06Q 10/10* | (2023.01) |
| *G06Q 20/40* | (2012.01) |
| *G06Q 40/02* | (2023.01) |
| *H04L 67/141* | (2022.01) |
| *H04M 3/56* | (2006.01) |
| *H04W 4/14* | (2009.01) |

(52) U.S. Cl.
CPC .......... *H04L 63/105* (2013.01); *G06Q 10/10* (2013.01); *G06Q 20/40* (2013.01); *G06Q 40/02* (2013.01); *H04L 63/083* (2013.01); *H04L 63/0853* (2013.01); *H04L 63/20* (2013.01); *H04L 67/141* (2013.01); *H04M 3/56* (2013.01); *H04W 4/14* (2013.01)

(58) Field of Classification Search
CPC . H04L 63/08; H04L 63/1425; H04L 63/1416; G06F 21/32
See application file for complete search history.

(56) References Cited

U.S. PATENT DOCUMENTS

| | | | |
|---|---|---|---|
| 5,206,495 A | 4/1993 | Kreft | |
| 5,953,710 A | 9/1999 | Fleming | |
| 6,671,818 B1 | 12/2003 | Mikurak | |
| 7,155,417 B1 * | 12/2006 | Sagar | G06Q 20/3676 705/68 |

(Continued)

FOREIGN PATENT DOCUMENTS

| | | |
|---|---|---|
| WO | WO-2015083159 A1 | 6/2015 |
| WO | WO-2016110588 A1 | 7/2016 |

OTHER PUBLICATIONS

Guardian-Based Financial Endorsement Enablement for Commerce; An IP.com Prior Art Database Technical Disclosure ; Authors et al.: Disclosed Anonymously (Year : 2019).

(Continued)

*Primary Examiner* — Khoi V Le
(74) *Attorney, Agent, or Firm* — Plumsea Law Group, LLC

(57) ABSTRACT

A method and system of securely enrolling delegates with an account management service so that the delegates can manage access to funds on behalf of a primary account holder is disclosed. The method and system include generating new profiles for proposed delegates, setting delegate approval policies, ensuring a sufficient number of delegates have been selected, and confirming the identity of each delegate.

19 Claims, 14 Drawing Sheets

(56) References Cited

U.S. PATENT DOCUMENTS

| | | | |
|---|---|---|---|
| 7,162,741 B2 * | 1/2007 | Eskin | H04L 63/1416 726/25 |
| 8,971,908 B1 | 3/2015 | Kirkpatrick et al. | |
| 10,445,739 B1 | 10/2019 | Sahni et al. | |
| 10,554,654 B1 * | 2/2020 | Ramanathan | H04L 63/104 |
| 2003/0110393 A1 * | 6/2003 | Brock | G06F 21/554 726/23 |
| 2003/0162565 A1 | 8/2003 | Al-Khaja | |
| 2004/0015702 A1 | 1/2004 | Mercredi et al. | |
| 2006/0156392 A1 | 7/2006 | Baugher | |
| 2009/0172793 A1 | 7/2009 | Newstadt et al. | |
| 2009/0254461 A1 | 10/2009 | Walker et al. | |
| 2009/0319353 A1 | 12/2009 | Palmeri | |
| 2011/0191209 A1 | 8/2011 | Gould | |
| 2012/0197793 A1 | 8/2012 | Grigg et al. | |
| 2013/0018792 A1 | 1/2013 | Casey et al. | |
| 2013/0030875 A1 * | 1/2013 | Lee | G06Q 30/0601 705/14.58 |
| 2013/0276118 A1 * | 10/2013 | Kashyap | H04L 63/1416 726/24 |
| 2013/0346302 A1 | 12/2013 | Purves et al. | |
| 2014/0201077 A1 | 7/2014 | Cama et al. | |
| 2014/0279513 A1 | 9/2014 | Dodds-Brown | |
| 2015/0033286 A1 | 1/2015 | Shahidzadeh | |
| 2015/0058214 A1 | 2/2015 | Cohen | |
| 2015/0120546 A1 | 4/2015 | Fernandes | |
| 2015/0302404 A1 | 10/2015 | Ruffer et al. | |
| 2015/0348032 A1 | 12/2015 | Ioveva et al. | |
| 2015/0348185 A1 | 12/2015 | Frost et al. | |
| 2016/0162812 A1 | 6/2016 | Rowley et al. | |
| 2017/0061406 A1 | 3/2017 | Adams | |
| 2017/0068938 A1 | 3/2017 | Narayana et al. | |
| 2017/0076274 A1 | 3/2017 | Royyuru et al. | |
| 2017/0337546 A1 | 11/2017 | Holmes | |
| 2018/0047026 A1 | 2/2018 | Vaidyanathan et al. | |
| 2018/0108011 A1 | 4/2018 | O'Regan | |
| 2018/0225666 A1 | 8/2018 | Khan et al. | |
| 2019/0108524 A1 | 4/2019 | Nicholson et al. | |
| 2019/0287106 A1 | 9/2019 | Sadeddin et al. | |
| 2019/0334884 A1 | 10/2019 | Ross et al. | |
| 2019/0370787 A1 | 12/2019 | Mueller et al. | |
| 2019/0385152 A1 | 12/2019 | Eu et al. | |
| 2020/0090148 A1 | 3/2020 | Lawrence et al. | |
| 2020/0211026 A1 | 7/2020 | Ross et al. | |

OTHER PUBLICATIONS

Non-Final Office Action dated Aug. 17, 2021 for U.S. Appl. No. 16/730,431.

Non-Final Office Action dated Feb. 19, 2021 for U.S. Appl. No. 16/728,791.

Final Office Action dated Jun. 22, 2021 for U.S. Appl. No. 16/728,791.

Non-Final Office Action dated Feb. 15, 2022 for U.S. Appl. No. 16/728,062.

Non-Final Office Action dated Nov. 30, 2021 for U.S. Appl. No. 16/728,791.

Notice of Allowance dated Dec. 13, 2021 for U.S. Appl. No. 16/730,431.

Notice of Allowance dated Apr. 11, 2022 for U.S. Appl. No. 16/728,791.

Notice of Allowance dated Jun. 29, 2022 for U.S. Appl. No. 16/728,062.

* cited by examiner

| RELATIONAL DEPTH | DELEGATES |
|---|---|
| DEPTH 1 | MOTHER |
| DEPTH 2 | BROTHER #1 |
| DEPTH 3 | COUSIN |
| DEPTH 4 | FRIEND |

| AUTHORIZATION LEVEL | AMOUNT THAT CAN BE APPROVED BY DELEGATE | IDENTITY INFORMATION REQUIRED |
|---|---|---|
| 0 | $250 MAXIMUM | TEXT-BASED AUTHORIZATION |
| 1 | UP TO $1000, $500/WEEK MAX, $350 MAX SINGLE INSTANCE | TAKE PHOTO WITH VALID CURRENT PHOTO ID ALONG WITH FACE AND HANDWRITTEN NOTE WITH PASS PHRASE |
| 2 | UP TO $50,000 $25K/WEEK MAX, $12.5K SINGLE INSTANCE MAX | SEND A SECOND FORM OF ID AND/OR SEND PHOTO TO PRIMARY ACCOUNT OWNER FOR VALIDATION |
| 3 | NO LIMITS | REQUIRES 3-WAY CALL WITH OWNER, DELEGATE AND BANK REPRESENTATIVE |

FIG. 13

METHODS AND SYSTEMS FOR MANAGING DELEGATES FOR SECURE ACCOUNT FUND TRANSFERS

CROSS-REFERENCE TO RELATED APPLICATIONS

This application is a Continuation of Russell, U.S. patent application Ser. No. 16/728,062, filed Dec. 27, 2019, and entitled "Methods and Systems for Managing Delegates for Secure Account Fund Transfer", which is incorporated by reference herein in its entirety.

TECHNICAL FIELD

The present disclosure generally relates to a method and system for requesting and receiving approval for the use of funds in a shared account, and specifically to a method and system for granting authorization to a particular amount of funds based on a secure and context-specific real-time request.

BACKGROUND

Financial account management tools have become an increasingly important resource for the average consumer. Financial services, particularly those now available for use via computing devices, can provide consumers the versatility and freedom to control their assets and credit. However, consumers with many different financial accounts, such as credit card accounts, utility accounts, mortgage accounts, etc., may have trouble keeping current with account balances, payments and other transactions. The consequences of mis-management may result in penalties being assessed against the consumer by the providing the accounts. For example, penalties may be associated with late payments or balance thresholds that are exceeded by a consumer. This type of issue is exacerbated when the account is co-held (e.g., a joint banking account) and one account holder incurs expenses that the other account holder is unaware of, at least until some time has passed following the transaction. For example, couples or parent-child account members may use a joint bank account and have joint credit or debit card accounts, whereby each person in the group individually draws on the same account and independently charges purchases to the joint account. If prompt communication regarding each purchase is not provided to the other members of the group, the charges may reach the credit card limit and/or the account may become overdrawn.

Thus, the costs associated with failures to communicate these payments to all account holders can be significant. Furthermore, in cases of a joint account in which one person is a guardian or the "primary owner" (such as a parent) and the other is a dependent or a "secondary owner" (such as a child), the primary owner can have a strong interest in reviewing some or all financial transactions related to the joint financial transactions in order to monitor expenditures and ensure that money is spent according to a proposed budget or other their personal expectations. Conventional methods of managing financial activities of other account holders (e.g., a joint bank account) do not provide a fine level of control or granularity for the primary owner to customize and personalize their expectations and limits of account-related financial activities. Additionally, conventional methods do not provide a secure method to manage third parties that may be able to control access to funds on behalf of the primary account holder. Additionally, conventional methods do not provide ways to authorize transactions when the primary account owner is unavailable to approve the transaction.

There is a need in the art for a system and method that addresses the shortcomings discussed above.

SUMMARY

In one aspect, a method for securely enrolling a delegate in a service that allows the delegate to manage access to funds held in a bank account includes steps of establishing communication with a banking application running on a user device through an account management service, receiving information indicating that a user of the banking application wants to enroll a new delegate for approving access to funds held in the bank account by a secondary user, receiving information about the new delegate, where the information includes a phone number, and automatically generating a message for the new delegate on the user device. The message includes a name of the user, an authentication token, and an authenticating web address. The method also includes steps of automatically sending the generated message using a messaging service, and enrolling the new delegate so that the new delegate can manage access to funds held in the bank account by the secondary user.

In another aspect, a method for securely enrolling a delegate in a service that allows the delegate to manage access to funds held in a bank account includes the steps of establishing communication with a banking application running on a user device through an account management service, receiving information indicating that a user of the banking application wants to enroll a new delegate for approving access to funds held in the bank account by a secondary user, receiving information about the new delegate, receiving a delegate approval policy for the new delegate, determining an authorization level based on the delegate approval policy, and automatically generating a message for the new delegate on the user device and sending the message to the new delegate using a messaging service. The message includes a request to provide identification information. The method also includes steps of receiving identification information from the new delegate, and enrolling the new delegate so that the new delegate can manage access to funds held in the bank account by the secondary user.

In another aspect, a system for securely enrolling a delegate in a service that allows the delegate to manage access to funds held in a bank account includes a primary approver interface for communicating with a user device, where the user device is associated with a primary account holder of the bank account. The system also includes a delegate enrollment module for enrolling delegates that can manage access to funds held in the bank account on behalf of the primary account holder and a delegate communication module for communicating with delegates.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a schematic view of a relational depth table, according to an embodiment;

FIG. 13 is a schematic view of a table showing authorization levels, approval amounts, and required identity information, according to an embodiment.

DETAILED DESCRIPTION

The embodiments provide a method and system for enrolling delegates with an account management service. The account management service facilitates authorization of purchases or account transactions made by a secondary account holder who shares a joint account with a primary account holder. When the primary account holder is unavailable, one or more delegates may be available to approve transactions on behalf of the primary account holder.

The embodiments include provisions for a user (the primary account holder) to enroll one or more delegates. Specifically, the user can select new delegates to be enrolled and set delegate approval policies that govern the types of transactions that the delegate can approve/deny. The embodiments include provisions for helping a user to enroll a sufficient number of delegates to minimize the chance that no delegates may be available when the secondary account holder requests approval for a transaction. The systems and methods also generate automated messages that can be sent to proposed delegates with a link and authentication code so that the delegate can be securely enrolled with the account management service. By generating automated messages at the point of the user's device, the embodiments facilitate trust between the delegate and the account management service, since the user initiates the enrollment process directly via a message over SMS. The systems and methods further facilitate requesting and obtaining identity information so that the identity of a proposed delegate can be authorized prior to giving the delegate access to approve/deny transactions.

Figure 1:
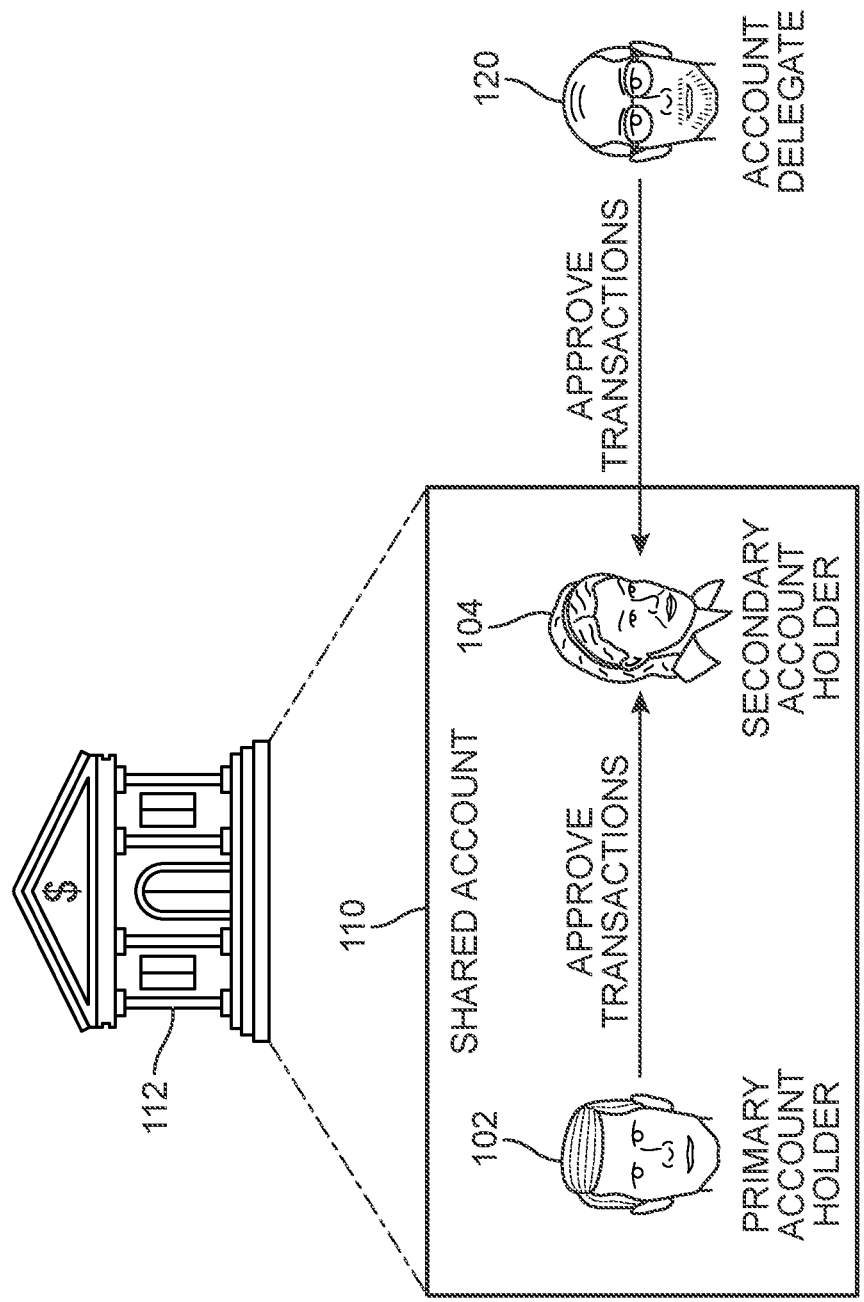
FIG. 1 is a schematic view of a configuration in which a primary account holder and an account delegate can approve transactions for a secondary account holder who shares a bank account with the primary account holder, according to an embodiment.

FIG. 1 is a schematic view of a scenario in which a primary account holder 102 shares a financial account 110 with a secondary account holder 104, according to an embodiment. In this case, both primary account holder 102 and secondary account holder 104 are members or customers of a financial institution 112, which maintains financial account 110. As used herein, a "primary" user, owner, account holder, or member may refer to a person or entity that is fully authorized to manage and access all aspects of a secured resource. Some non-limiting examples include an employer, parent, supervisor, spouse, or other custodian of a secured resource. In contrast, a "secondary" user, owner, account holder, or member is a person who may be provided access to the secured resource, but whose access is regulated by a primary owner. Some non-limiting examples include a child, dependent, minor, employee, spouse, volunteer, or other person who may need to access the secured resource, but whose usage must be regulated or monitored.

In the example of FIG. 1, primary account holder 102 may be a father, and secondary account holder 104 may be his daughter. In this case, secondary account holder 104 may be a student in college who is permitted access to some funds provided by her parents via shared financial account 110.

In this example, primary account holder 102 may have the ability to control how funds are disbursed to secondary account holder 104. For example, primary account holder 102 could have the ability to require that all withdrawals, transfers, or other financial transactions made by secondary account holder 104 be approved. This approval could be provided directly by primary account holder 102, or by some other party, referred to hereafter as a "third party approver," "delegate," or "surrogate". An approver, surrogate, or delegate is a person who has been given the power to determine whether a transaction or set of transactions or other use of the secured resource is permitted for a specific secondary user. In other words, the delegate may approve or deny requests for specific transactions (for example, a withdrawal of funds from the shared account) made by a secondary user or account holder.

As seen in FIG. 1, an account delegate 120 is also able to approve transactions, such as withdrawals, transfers, or other transactions, which may be made by secondary account holder 104. In this scenario, account delegate 120 may be a grandfather to secondary account holder 104. This arrangement helps ensure that someone is always available to approve or reject fund requests even when primary account holder 102 is unavailable.

The term "financial institution" shall refer to any institution that holds funds for others, including without limitation banks, savings and loans, credit unions, colleges or universities, and accounts that may be accessed through ATMs. In addition, the term "financial institution" shall also refer to credit card issuers. Also, the terms "merchant" and "retailer" shall include any person, entity, distributor system, software, and/or hardware that is a provider or broker of goods/services, and includes any other entity in the distribution chain of goods/services. For example, some common merchant/retailers may include a grocery store, a retail store, a travel agency, a service provider, a public-service utility, a school, a library, an on-line merchant, a government agency, and so on. A non-typical merchant may be a host of a garage sale or a host of a fund-raising activity, or other independent sellers. Generally, a consumer may communicate or interact with a merchant in person (e.g., in person at a store), telephonically, or electronically (e.g., from a computer via the Internet).

Although the exemplary embodiment depicts a scenario in which a parent and child share a joint banking account, other scenarios involving primary and secondary account holders are also possible. For example, in another embodiment, the primary account holder may be an insurance company from whom the secondary account holder has purchased an insurance policy to cover his or her car, rental unit or home, for example. The policy holder (who would be the secondary account holder in this example) may have been provided with a chip card so that he or she may make purchases and charge those purchases to the insurance company. For example, the insurance company may have a list of approved providers that the policy holder is invited to work with or shop from. In those cases, the insurance company would like to retain control over the amounts charged to the chip card. Moreover, to the extent that employees within the insurance company may be unavailable, the insurance company may decide to appoint certain persons who are not employees of the insurance company, such as agents, adjusters or contactors, to act as delegates in determining whether a particular transaction should be approved. Thus, the embodiments described herein may apply to cases in which an insurance company is the primary account holder.

In other cases, the financial institution may be an insurance company holding funds owed to an insured party (for example, a home owner whose home has been damaged) or to an injured party whom the insured has injured, and to whom the insured is liable for the damages the insured caused to the injured party (such as person who was injured in a traffic accident caused by the insured). In these cases, the primary account holder may be the insured party or may be the injured party. In those cases, the secondary account holder may be a party providing services to the insured homeowner (a plumber, for example) or to the injured party (a surgeon, for example). In either of these possible scenarios, should the secondary account holder (the plumber or the surgeon) submit an invoice for payment, the primary account holder (either the insured party or the injured party in these scenarios) may delegate approval or denial decisions to a surrogate whenever the primary account holder may be unavailable.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. Security systems use this identity when determining if a subject can access an object. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The most common usage will be to bank accounts or other instruments offered by financial institutions, but other types of resources such as company or organizational resources, physical objects such as vehicles, can also be managed by the tools as discussed herein. As used herein, a "financial transaction account," also referred to herein as a "transaction account," is a specific type of secured resource that may include a bank account, a credit account, etc. For example, a bank account may refer to a savings account, a checking account, a money-market account, etc. and a credit account may refer to a transaction account associated with a pre-approved line of credit. A transaction refers to any type of action or event that is linked to a use or access of a secured resource.

While several specific examples of account management methods and systems for co-owned accounts will be described below, it is to be understood that the various aspects and features of each embodiment may be applied to any of the particular applications discussed herein. Thus, in some embodiments, the system may be offered as a stand-alone account management system or as a component of an integrated software solution for account management. In another embodiment, the system can be integrated into existing business and financial processes and products.

Figure 2:
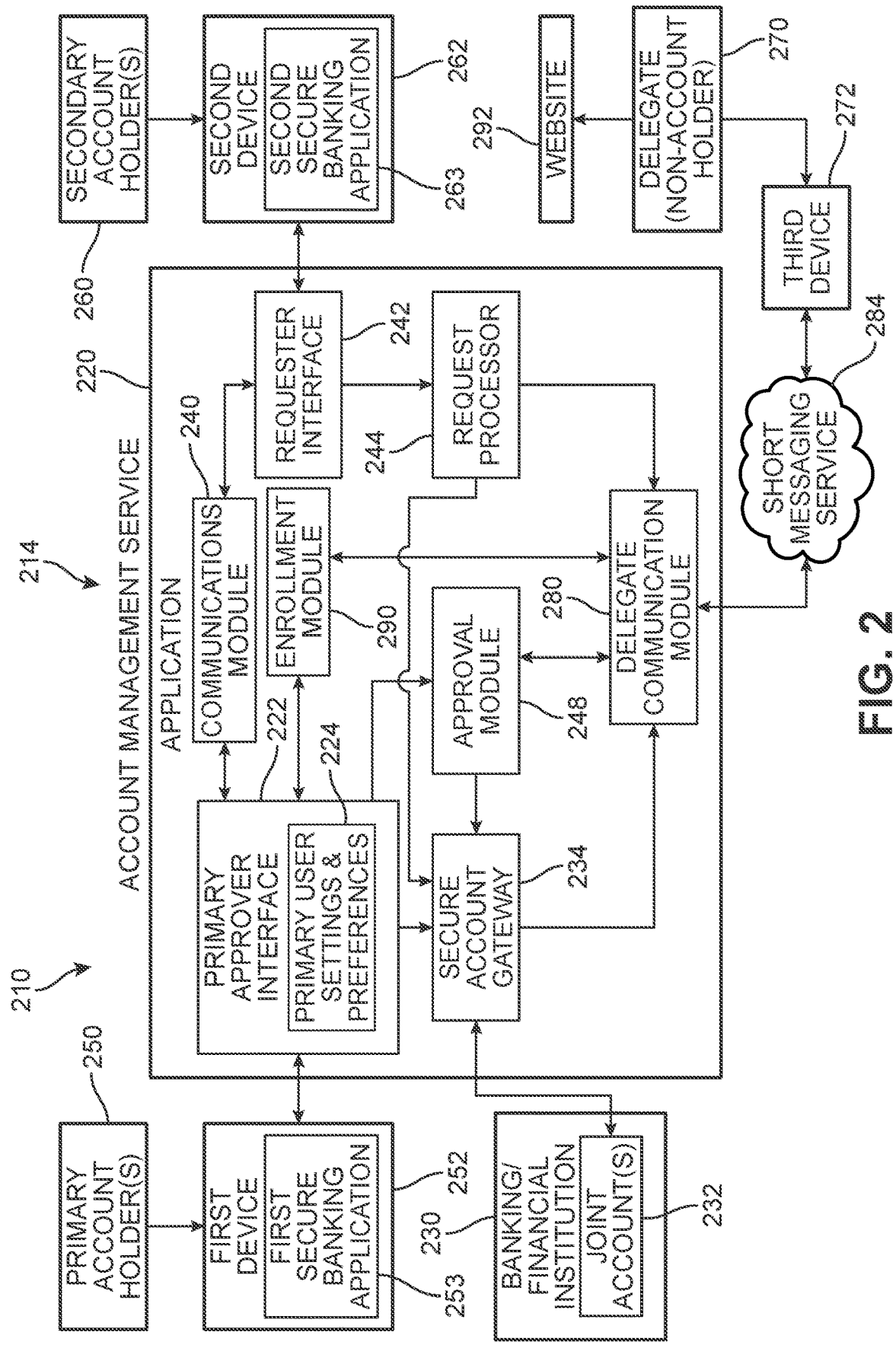
FIG. 2 is a schematic view of an account management architecture, according to an embodiment.

FIG. 2 is a schematic view of an account management architecture 210 (or simply, architecture 210) that facilitates approving financial transactions (such as fund withdrawals) that may be requested by a secondary account holder 260 with less than full account access. Architecture 210 includes an account management service 214 (or account management platform) that is used to manage aspects of a banking account (or other financial account) and to facilitate approvals for transactions made by secondary account holder 260.

Account management service 214 (or simply, service 214) further includes various provisions that provide the ability for primary account holder 250 to approve fund requests from secondary account holder 260 in a secure manner. In particular, service 214 facilitates communication between a first computing device ("first device") 252 that for purposes of illustration will be used by primary account holder 250 and a second computing device ("second device") 262 that for purposes of illustration will be used by secondary account holder 260. The devices can access and make use of account management service 214 that works in conjunction with a fund management application ("application") 220. Application 220 can be configured to release funds for use by a secondary user from a registered joint account 232 associated with a bank or other financial institution or other secured resource 230 when approval of a specific request is received.

To communicate with service 214, each of first device 252 and second device 262 may be configured to run a local application that communicates with service 214. For banking, the local application may be a banking application. For example, first device 252 may run a first secure banking application 253, while second device 262 may run a second secure banking application 263. These banking applications may be configured to communicate with service 214 directly, using, for example, application programming interfaces (APIs) associated with service 214. This allows communication to be performed in a secure manner, as each device may need an appropriate API key and/or other authentication information to send and/or receive information from service 214. Moreover, the information exchanged between these applications and service 214 can take on a variety of different formats. In some cases, the information could be sent as structured data, rather than as simply strings of characters. In some cases, form data can be exchanged.

The primary account holder 250 can enroll his or her secured resource, such as a bank account, for management through service 214. Thus, in some embodiments, the financial institution 230 can be configured to connect and/or facilitate the flow of information associated with the joint account 232 via a secure account gateway ("gateway") 234 to the service 214 and receive instructions regarding the joint account 232 through the gateway 234. The primary account holder 250 can register for the service through first device 252 and interact with the application 220 via a primary approver interface 222 which is configured to offer the management tools and features for the selected joint account. The primary account holder 250 can create and modify primary user settings and preferences 224 that will be used to determine the transaction circumstances and context in which an approval will be required, as well as which persons are authorized to provide such approval.

When a secondary account holder 260 intends to make a purchase or attempt some use of a secured resource regulated by the platform 214, in some embodiments, he or she may opt to first review the conditions of such use through a requester interface 242 via second device 262. If the intended transaction falls outside the scope of any controls and conditions identified by the primary account holder 250, the secondary account holder 260 may proceed with the transaction without delay. If however, the intended transaction is of a type or amount that matches a pre-defined condition established by the primary account holder 250, the secondary account holder 260 may enter the necessary information about the transaction through requester interface 242 to generate a request for approval of the desired transaction. The request can be received by a request processor 244, which can determine, based on access to information about the current availability of the secured resource and the settings selected by the primary account holder 250, how the request should be handled. A communications module 240 can generate a message or notification regarding the request for presentation to the designated approver, which may include the primary account holder 250. Submission of an approval response can trigger a release of the requested funds via a primary approval module 248 that coordinates directly with the financial institution 230 to ensure only the approved amount is made available to the secondary account holder 260.

In some cases, primary account holder 250 may be unavailable to approve fund requests or other transactions. In such cases, approval can be provided by a delegate 270. In some cases, delegate 270 may not have direct access to service 214. This may occur for various reasons. For instance, delegate 270 may not be named on joint account 232 and/or may not have any account with the associated financial institution 230. This may limit the ability of service 214 to communicate with delegate 270 in a secure manner. In such cases, therefore, it may be necessary to utilize a separate system for facilitating communication between delegate 270 and service 214.

Referring to FIG. 2, architecture 210 may further include a delegate communication module 280. Delegate communication module 280 includes provisions for communicating with a delegate to obtain approval for fund requests and other transactions.

Communication between delegate communication module 280 and delegate 270 is mediated by a short messaging service 284, also known as an SMS. A short messaging service is a text-based messaging service that is integrated into many telephone, internet, and mobile device systems. SMS uses standardized communication protocols to pass text messages between mobile devices and/or other devices utilize the SMS. As seen in FIG. 2, delegate communication module 280 passes messages to third device 272 over SMS 284.

As seen in FIG. 2, in some cases, delegate 270 may have access to a website 292 to provide authentication. This website could be accessed on third device 272 and/or on a separate device, such as a desktop computer.

Using the exemplary configuration, architecture 214 provides two distinct modes of communication. These include a first mode of communication that occurs through account management service 214. Specifically, when primary account holder 250 is available to approve a fund request from secondary account holder 260, all communication is mediated directly between each account holder's device (specifically, an application running on their device) and account management service 214. This mode of communication is available to account holders or other users who have the proper authentication to interact directly with service 214. This authentication may occur via passwords, API keys, or other known methods of authentication.

A second mode of communication occurs through short messaging service 284. Specifically, when primary account holder 250 is unavailable to approve a fund request from secondary account holder 260, communication with delegate 270 is mediated through short messaging service 284, since third device 272 is not able to communicate directly with service 214. By contrast with the first mode of communication, in which devices communicate directly with an account management service using authenticated methods, this second mode of communication does not require that the delegate be authenticated by the account management service.

Service 214 may also include provisions for enrolling new delegates. Specifically, service 214 may include a delegate enrollment module 290. Enrollment module 290 includes provisions for enrolling new delegates, as described in further detail below. Enrollment module 290 may communicate with at least primary approver interface 222 and delegate communication module 280.

It may be appreciated that communication between different components of architecture 210 can be accomplished using a variety of different communication systems and using a variety of different communication protocols. In different embodiments, various devices, entities, and modules are configured to communicate with one another, for example via a Wi-Fi, cellular, or other network connection and make use of and receive and share data with service 214. In some examples, devices can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers.

While the application 220 and the other various components of service 214 are shown as residing outside of devices such as first device 252 and second device 262, in other embodiments some or all modules and components described herein can reside locally on a user device and/or a local financial network. In some embodiments, some or all components of service 210 may be stored at and executed by multiple computing systems, while in another embodiment, these components may be accessed via one or more web-based applications accessed and executed via the bank network and/or a network connection. It should further be understood that the architecture 210 as presented is for purposes of illustration only, and other embodiments may utilize different or additional processes and steps, a different ordering of these steps, or omit one or more steps shown.

Although the exemplary architecture depicts communication with a delegate over SMS, in other embodiments any other messaging system could be used. For example, communication could be mediated through various proprietary messaging systems offered by various companies, including many popular social media messaging systems. As another example, communication could be mediated through various kinds of open source messaging systems.

Figure 3:
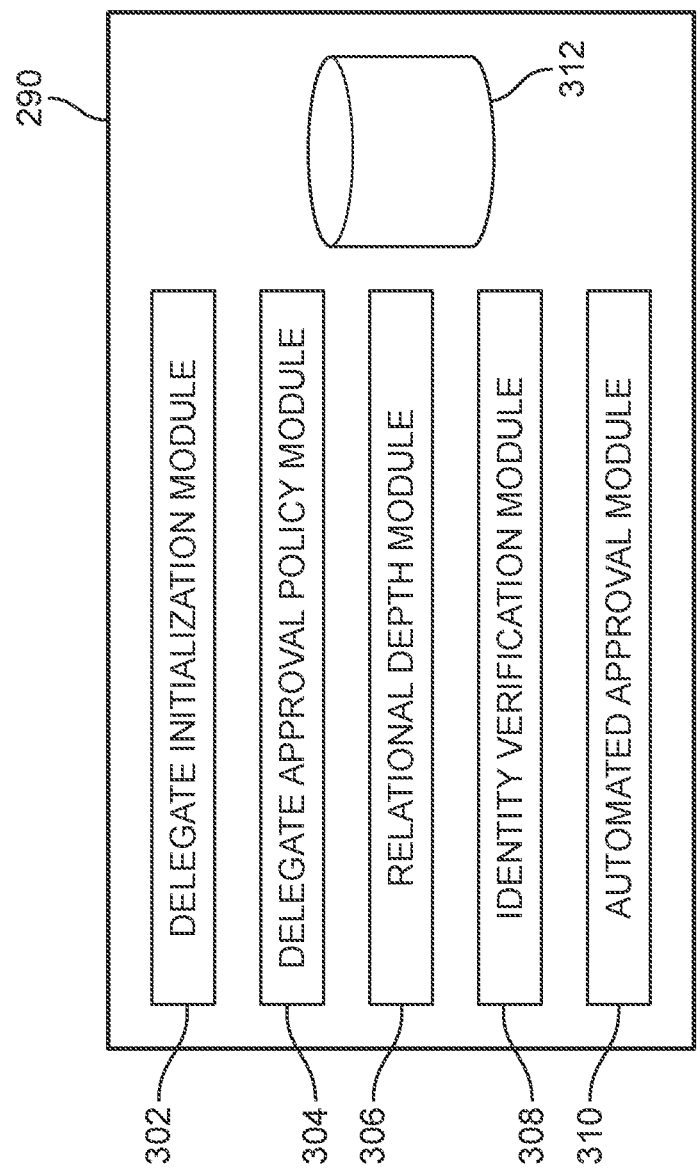
FIG. 3 is a schematic view of an enrollment module, according to an embodiment.

FIG. 3 is a schematic view showing some components of delegate enrollment module 290. Module 290 may include a delegate initialization module 302, which may be user to create a new delegate profile based on information retrieved from a user and/or other sources. Enrollment module 290 may also include a delegate approval policy module 304, which may be used to create and store approval policies indicating the types of controls a delegate has to approve transactions. Enrollment module 290 may also include relational depth module 306, which may be used to ensure that a user provides enough delegates to a sufficient relational depth from the user (primary account holder) or secondary account holder. Enrollment module 290 may also include an identity verification module 308, which can be used to determine the type of identification information needed to verify the identity of a delegate. Identity verification module 308 may also work with delegate communication module 280 to request identity verification information from a proposed delegate. Enrollment module 290 may also include an automated approval module 310, which is used to make automated decisions about whether a transaction should be approved based on previous transaction history, as well as previous approval history. In another embodiment, automated approval module 310 could be disposed within approval module 248 (see FIG. 2). In some cases, enrollment module 290 may include a data storage 312 that can be used to store delegate information, approval policy settings, relational depth information, identity information, as well as other information. In some cases, some of this data could also be stored in other components, such as within primary user settings and preferences 224 (see FIG. 2) of primary approver interface 222.

Figure 4:
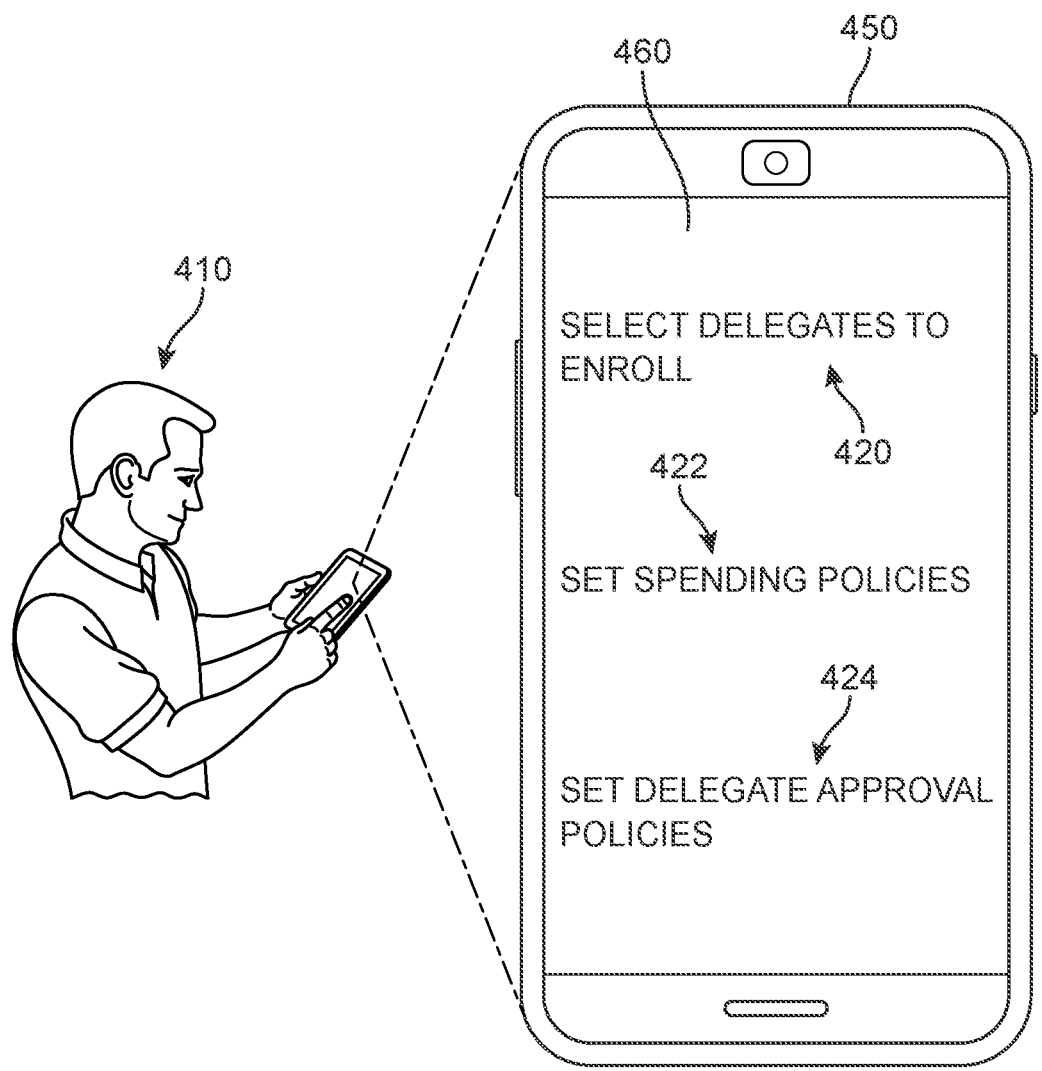
FIG. 4 is a schematic view of a user beginning a process of enrolling a delegate, according to an embodiment.

FIG. 4 is a schematic view of a scenario in which a user 410 (the primary account holder) may want to enroll new delegates that can manage access to funds. In FIG. 4, a user 410 is using a banking application 460 running on a user device 450. In particular, user 410 has previously selected an option within the application associated with enrolling new delegates who can manage access to funds from secondary account holders (such as the user's son or daughter). As seen in this example, banking application 460 provides user 410 with the option to select delegates to enroll (option 420), set spending policies (option 422), and set delegate approval policies (option 424).

Option 420 allows user 410 to begin the process of enrolling new delegates. Option 422 allows user 410 to set the spending policies associated with the shared bank account. These spending policies could include rules about what may or may not be purchased by one or more account holders. The spending policies could also provide, for example, maximum withdrawal amounts. Option 424 allows user 410 to set delegate approval policies. Delegate approval policies include any rules regarding what a particular delegate is allowed to approve. For example, the primary account holder may have the ability to approve any transaction amount requested by a secondary account holder. By contrast, a delegate may only be able to approve transactions up to a predetermined amount specified by the delegate approval policies. Delegate approval policies may also include information about a total number of transactions that can be approved by a delegate. For example, a primary account holder may permit a delegate to approve a single transaction of up to $500. Once a delegate has approved a single transaction up to $500 he or she may no longer be authorized to approve fund requests until the primary account holder updates the delegate approval policies.

Figure 5:
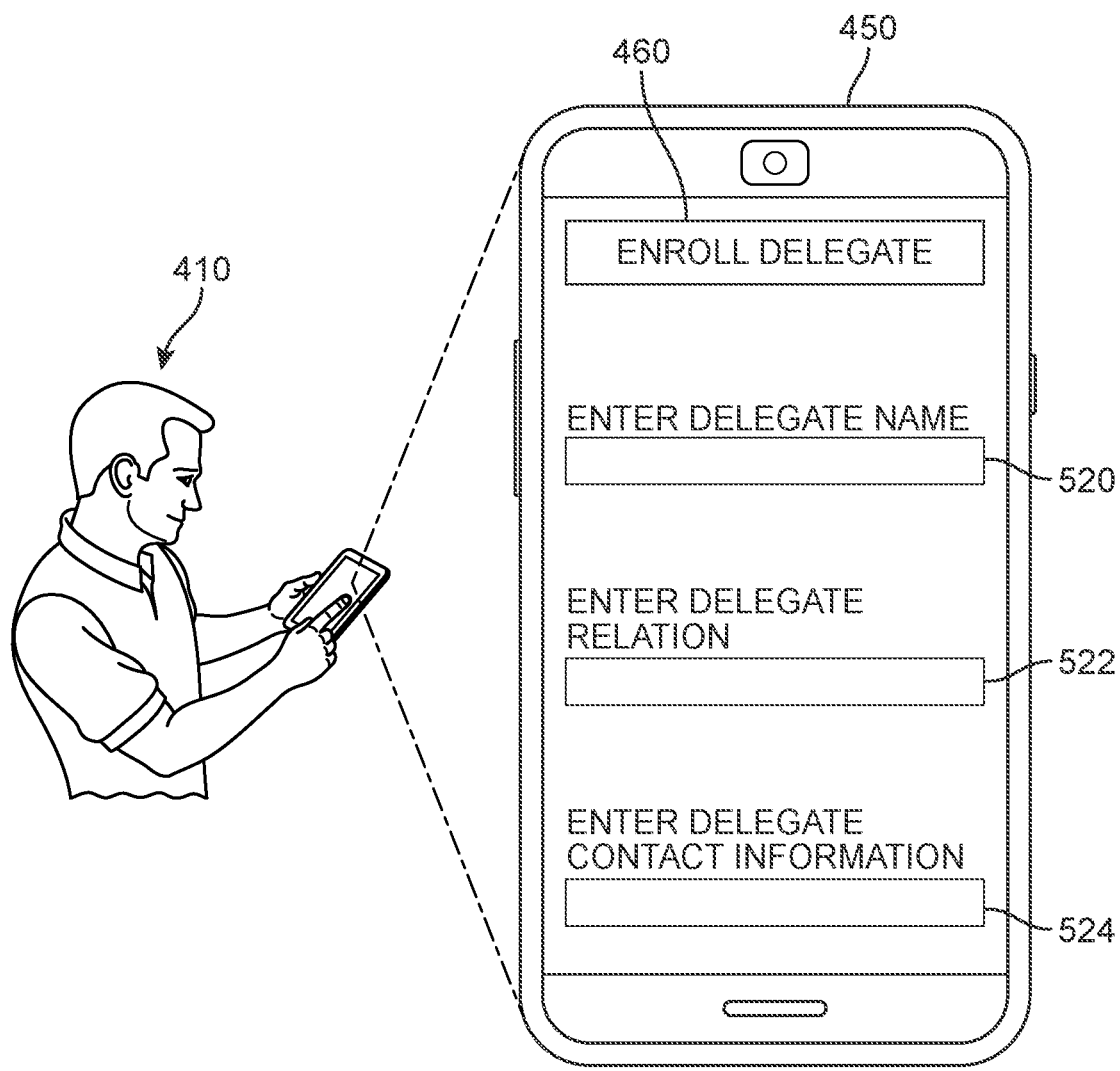
FIG. 5 is a schematic view of a user entering delegate information into a form, according to an embodiment.

When user 410 selects option 420, he may be taken to a form 500 within the application, which is shown schematically in FIG. 5. Using this form, user 410 may enter information about the new delegate they want to enroll. This information may include, but is not limited to: the delegate's name (data field 520), the delegate's relation to the primary and/or secondary account holder (data field 522), and the delegate's contact information (data field 524).

Once information for a delegate has been filled out using the form 500, the user could be prompted to enroll additional delegates. In some cases, an account management service may prompt a user to enroll additional delegates until a sufficient relational depth has been achieved in the user's delegate contact list. As user herein, the term "relational depth" refers to a measure of relational distance between either the primary account holder or the secondary account holder and a delegate. For example, the relational distance between a secondary account holder and the secondary account holder's mother is small, and therefore the relational depth is small. Thus, relations such as parents, siblings, cousins, uncles, and friends of a person may all be associated with distinct relational depths.

By enrolling multiple delegates having different relational depths (to the primary or secondary account holder), the system increases the chances that at least one of the delegates will be available when the secondary account holder requests approval for a transaction. This is based on the assumption that delegates at similar relational depths may have more overlap in their schedules (that is, their schedules will be more correlated), and thus may be unavailable at similar times. For example, parents of a secondary account holder may travel together and therefore be simultaneously unavailable to approve fund transfers. Likewise, siblings may travel together and/or with their parents. By contrast, a cousin's availability may be less correlated with the availability of parents and/or siblings of a secondary account holder. Similarly, a friend's availability may not be correlated at all with the availability of the family members in the secondary account holder's family. Thus, by prompting a user to enter additional delegates who are associated with different relational depths, the system helps ensure that at least one of the delegates in the list will be available to approve any fund transfers or other requests from a secondary account holder.

FIG. 6 is a schematic view of a table 600 showing different relational depths for different relations. It may be appreciated that the relations could be relative to the primary account holder or the secondary account holder. For purposes of illustration, the exemplary table in FIG. 6 uses relations relative to the secondary account holder, who is the primary account holder's daughter. At a first relational depth ("Depth 1"), the mother of the secondary account holder is listed. At a second relational depth ("Depth 2"), a brother of the secondary account holder is listed. At a third relational depth ("Depth 3"), a cousin of the secondary account holder is listed. At a fourth relational depth ("Depth 4"), a friend of the secondary account holder is listed.

Figure 7:
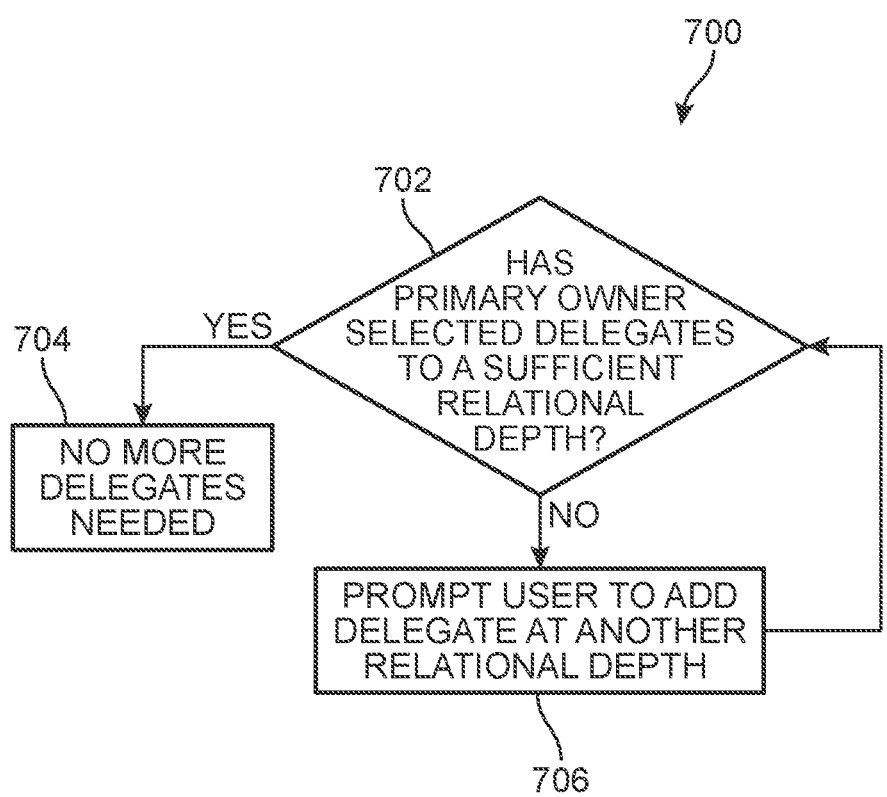
FIG. 7 is a schematic view of a process of prompting users to add new delegates, according to an embodiment.

FIG. 7 is a schematic view of a process of prompting a user to select delegates to a sufficient relational depth. Starting in step 702, the system determines if the primary account holder has selected delegates to a sufficient relational depth. If so, the system proceeds to step 704 where it is determined that no more delegates are needed. However, if more delegates are needed, the system proceeds to step 706 to prompt the user to add a delegate at another relational depth. For example, if a primary account holder has entered delegates corresponding to parents and siblings of the secondary account holder, the primary account holder could select a cousin, aunt, uncle, friend, colleague, or other delegate at a further relational depth from the secondary account holder. In some cases, an enrollment module could require a user to enter delegates to at least a predetermined depth, which could be suitably selected for different embodiments.

In some embodiments, a user may have the option of designating the bank or financial institution associated with the joint financial account as the final delegate. As used herein, a "final delegate" may only be used to approve a transaction in the event that no other delegates in a list of enrolled delegates are available.

Figure 8:
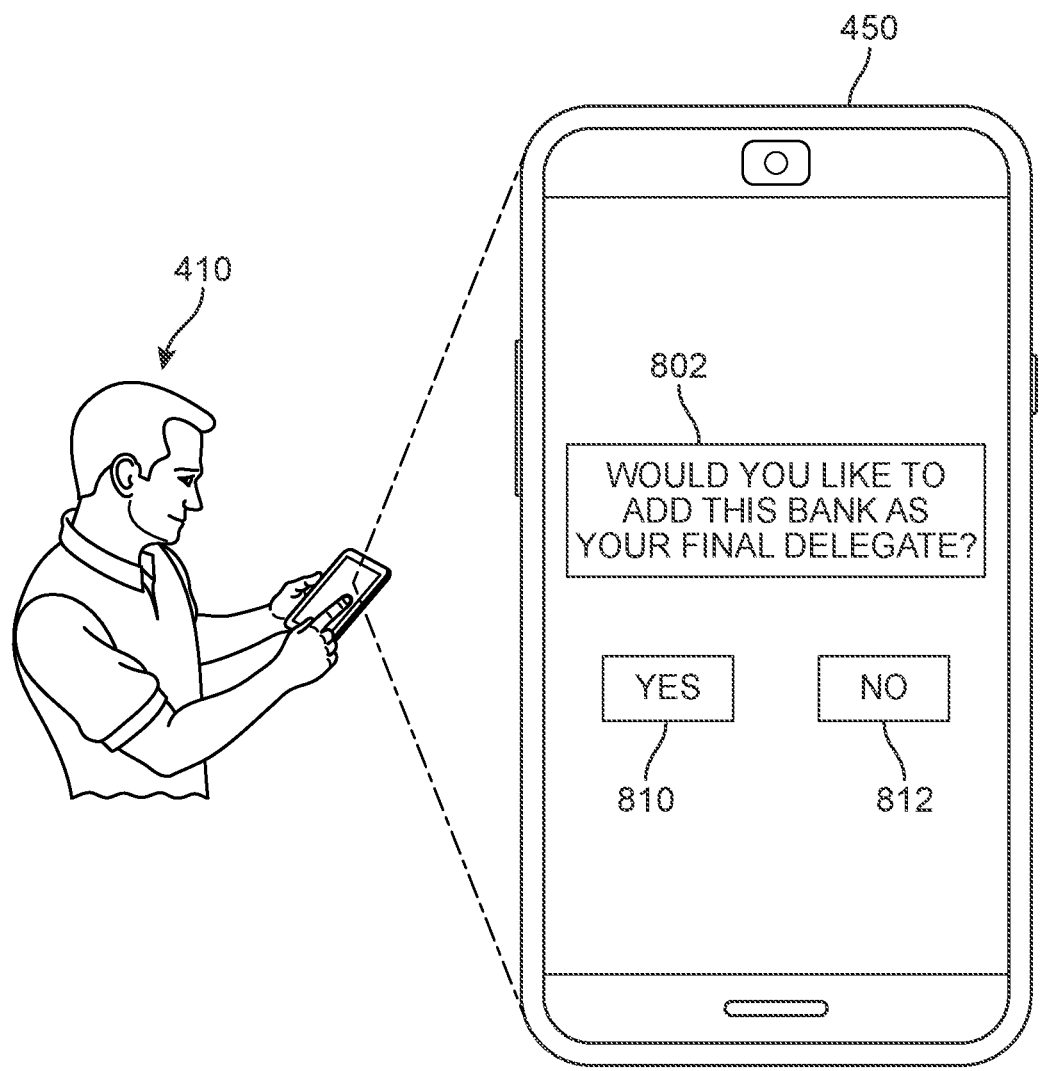
FIG. 8 is a schematic view of a step in a process of adding a financial institution as a final delegate, according to an embodiment.

In FIG. 8, once the user has entered delegates to a sufficient relational depth, the system could display message 802 on device 450. This message asks the user if he or she would like to add this bank (that is, the bank associated with the joint account) as the final delegate. The user then has the option of selecting a YES option 810 or a NO option 812.

A bank or financial institution could act as a final delegate in one or more ways. In some cases, the bank could forward transaction requests to representatives of the institution who could review the transactions and the general spending policies of the account to determine if the transaction should be approved. In other cases, a fund request could be forwarded to an artificially intelligent agent to approve or deny transactions. The agent could automatically review transaction histories and/or approval histories associated with the account and determine if the current fund request should be approved.

Figure 9:
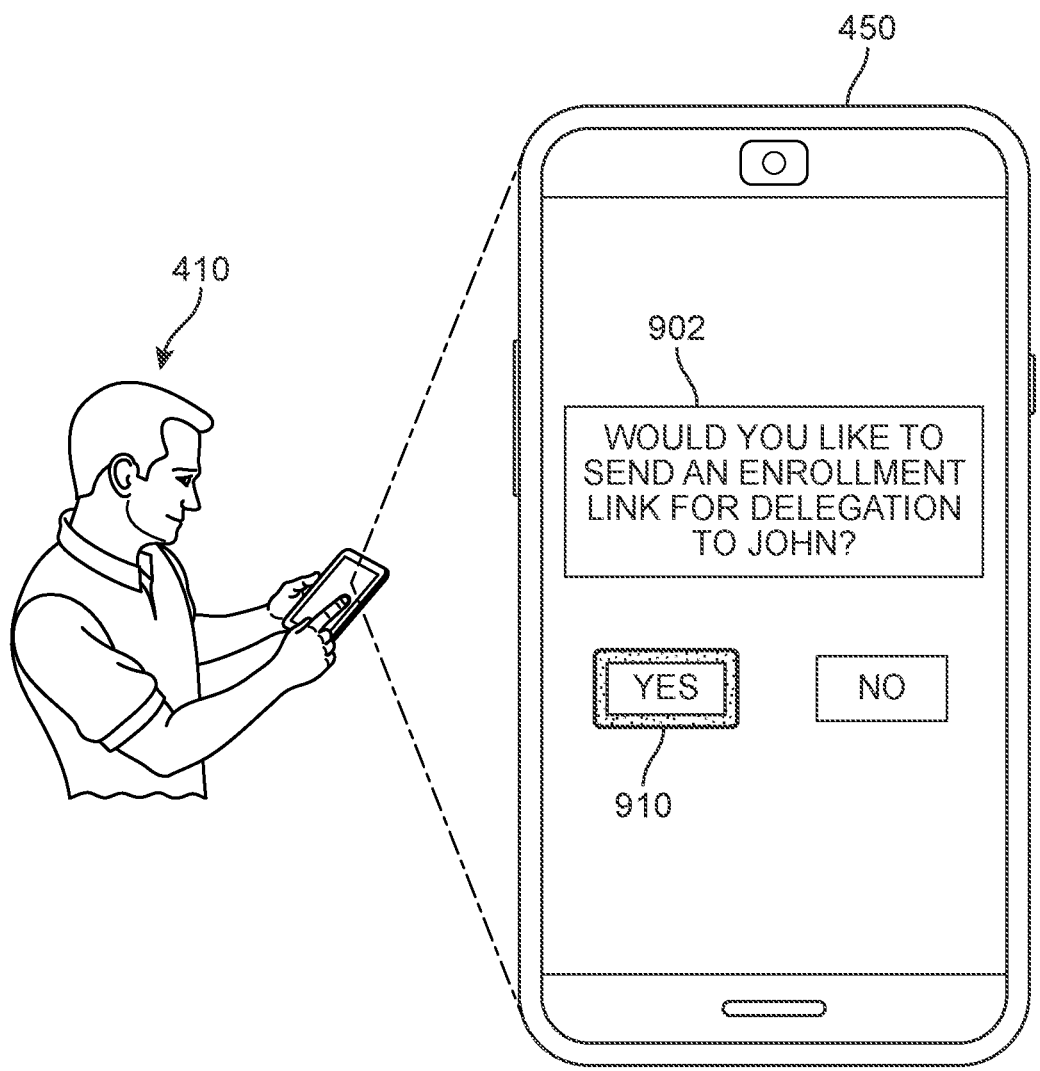
FIG. 9 is a schematic view of a step in a process for sending a delegate enrollment request, according to an embodiment.
Figure 10:
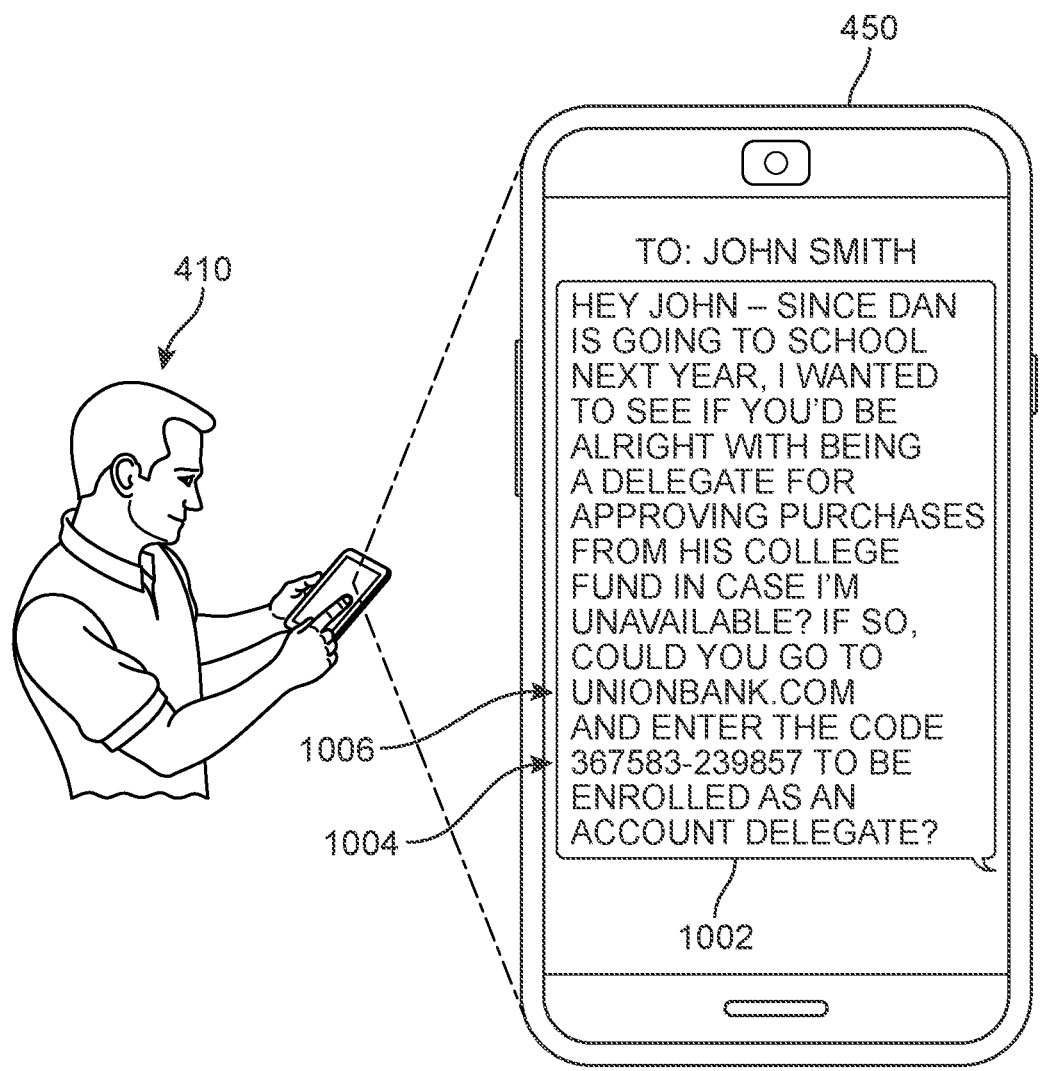
FIG. 10 is a schematic view of another step in a process for sending a delegate enrollment request, according to an embodiment.
Figure 11:
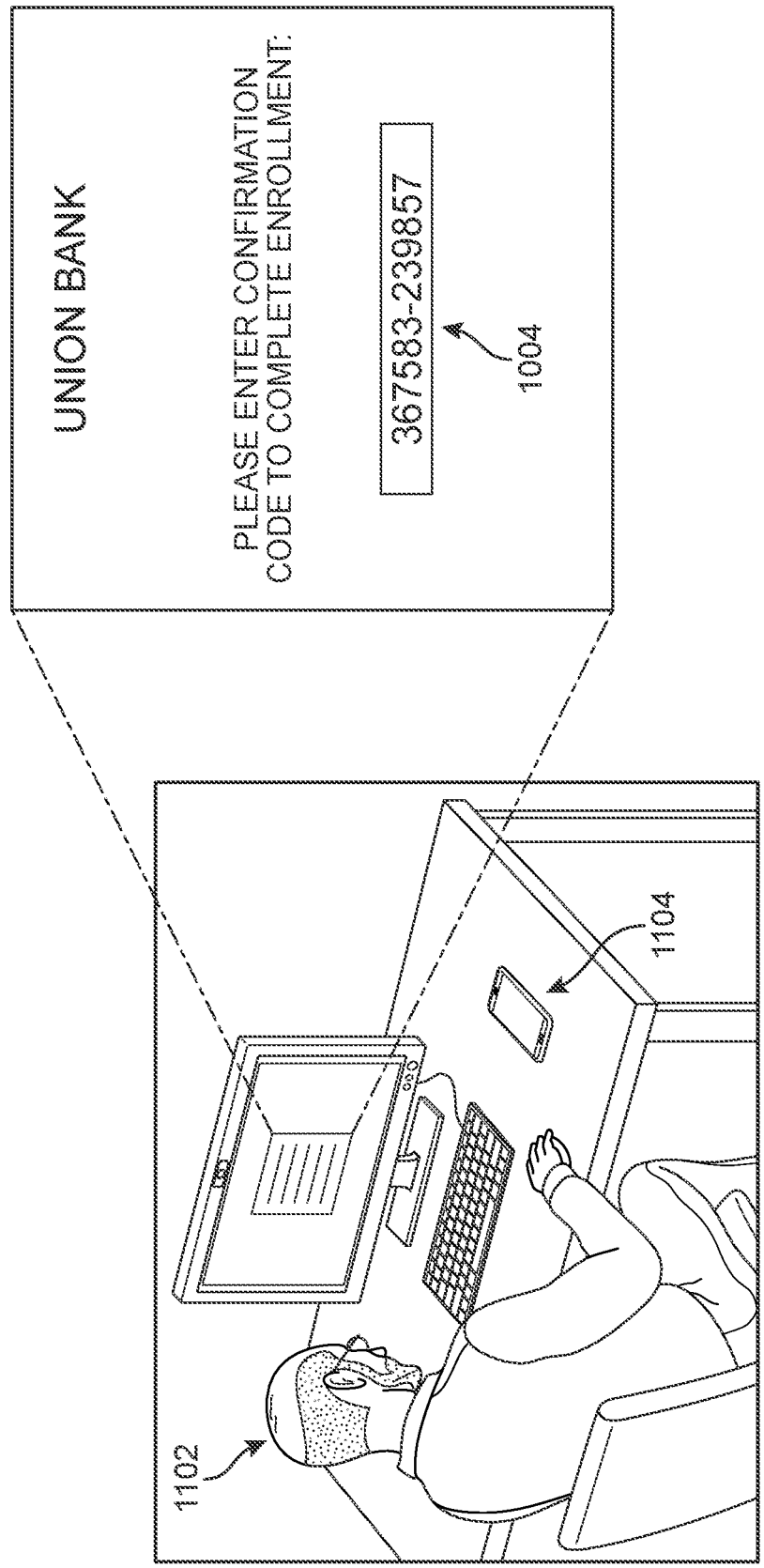
FIG. 11 is a schematic view of a delegate entering a confirmation code into a web application, according to an embodiment.

FIGS. 9-11 depict schematic views of steps in a process of informing a third party that he or she has been asked to be a delegate for the user. As a first step in the process, depicted schematically in FIG. 9, the account management service may automatically generate a message 902 asking user 410 if he would like to send an enrollment link to the proposed delegate ("JOHN"). As indicated in FIG. 9, user 410 selects the YES option 910, indicating that he would like to send an enrollment link to the proposed delegate.

In FIG. 10, the service may automatically generate a text-based message 1002 to be sent to the proposed delegate ("JOHN SMITH"). This message includes information about the request, a confirmation code 1004, and a web address 1006 for entering the confirmation code. In FIG. 11, a proposed delegate 1102 has received the delegate request message (sent by user 410) on his device 1104. Moreover, delegate 1102 has connected to the indicated web address and entered in the specific confirmation code 1004.

Once a proposed delegate has determined that he or she is willing to be a delegate, the system may take steps to obtain identification information from the delegate. This ensures that the person who has accessed the confirmation link is in fact the same person the user has intended to be a delegate.

Figure 12:
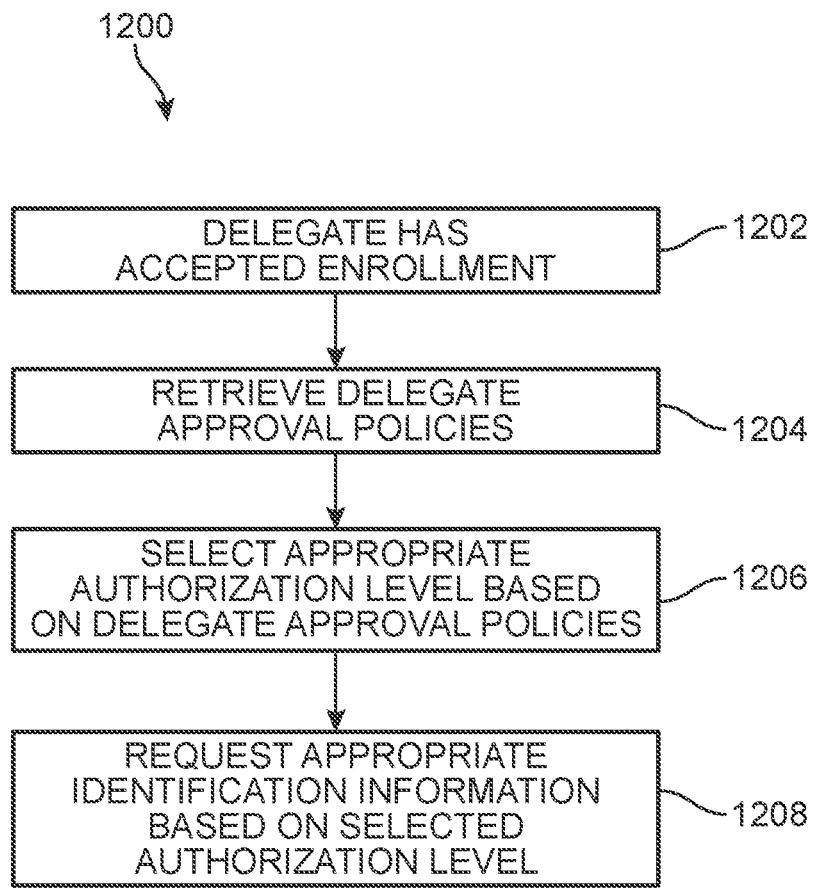
FIG. 12 is a schematic view of a process for obtaining identification information from a delegate, according to an embodiment.

FIG. 12 is a schematic view of a process 1200 for obtaining identification information from a delegate based on a predetermined authorization level. It may be appreciated that one or more of the following steps could be accomplished by an account management service, such as service 214 (see FIG. 2). More specifically, in some cases, one or more steps may be accomplished by an enrollment module of an account management service (for example, enrollment module 280).

Starting in step 1202, service 214 has determined that the delegate has accepted enrollment. At this point, the service must request the necessary identification information so that the delegate can be trusted to approve transactions. In step 1204, service 214 may retrieve delegate approval policies. These policies may be set by the user at an earlier point, as described above and shown schematically in FIG. 4. In step 1206, service 214 may select an appropriate authorization level based on information indicated in the delegate approval policies. For example, if the user indicates that the delegate can approve transactions up to $500, this may correspond with a particular predetermined authorization level. The authorization level may be further associated with a particular set of identification requirements. In step 1208, the service may request the appropriate identification information from the proposed delegate based on the selected authorization level. In some cases, the service can request that the identification information be supplied directly to the account management service. For example, the delegate could reply to a message requesting identification information with the requested information. In other cases, the identification information may be provided to a user (the primary account holder), who may help verify the delegate's identity.

FIG. 13 is a schematic view of a table 1300 representing a set of identification requirements, according to an embodiment. Specifically, table 1300 has a column for "authorization level", a column indicating amounts that can be approved by a delegate, and another column indicating the required identity information to verify a delegate with the associated authorization level. For example, authorization level "0" corresponds with a policy that sets a $250 maximum on the amount that a delegate can approve. In this case, the delegate's identity can be verified using any known text-based authorization process. "Authorization level 1" corresponds with a policy that sets controls of "up to $1000 total", "$500 per week max" and "$350 maximum in a single instance". In this case, the delegate must provide a photo that includes: a valid current photo ID, the delegate's face, and a handwritten note with a predetermined pass phrase. "Authorization level 2" corresponds with an approval policy that sets controls of "up to $50,000 total," "$25K per week max," and "$12.5K single instance max." For this authorization level the delegate must provide a second form of ID and/or send a photo to the primary account holder for validation. "Authorization level 3" corresponds to an approval policy that has no limits. In this case, a delegate may approve any transactions requested by a secondary account holder. To verify the delegate's identity in this case requires a 3-way call with the primary account holder ("owner"), the delegate, and a representative from the bank (or other financial institution). It may be appreciated that at each authorization level, the delegate may be required to submit identity information listed in the table for that authorization level, as well as the information listed in the previous (lower) levels. For example, to verify the delegate's identity for "authorization level 1", the delegate would need to provide both text-based authorization (associated with "authorization level 0") and the photo requirements described above for "authorization level 1".

Using this configuration, the type of identification requested of a delegate may be commensurate with the risk associated with the types of transactions that the delegate can approve. For example, if a delegate is only able to approve a limited number of small transactions, there is lower risk for the primary account holder associated with this control and so a delegate may not be asked to put in significant effort to have their identity verified. By contrast, if a delegate is able to approve very large transactions (relative to the funds in the account), there is more risk to the primary account holder associated with this control and therefore the delegate may be asked to expend more effort to have their identity verified.

Figure 14:
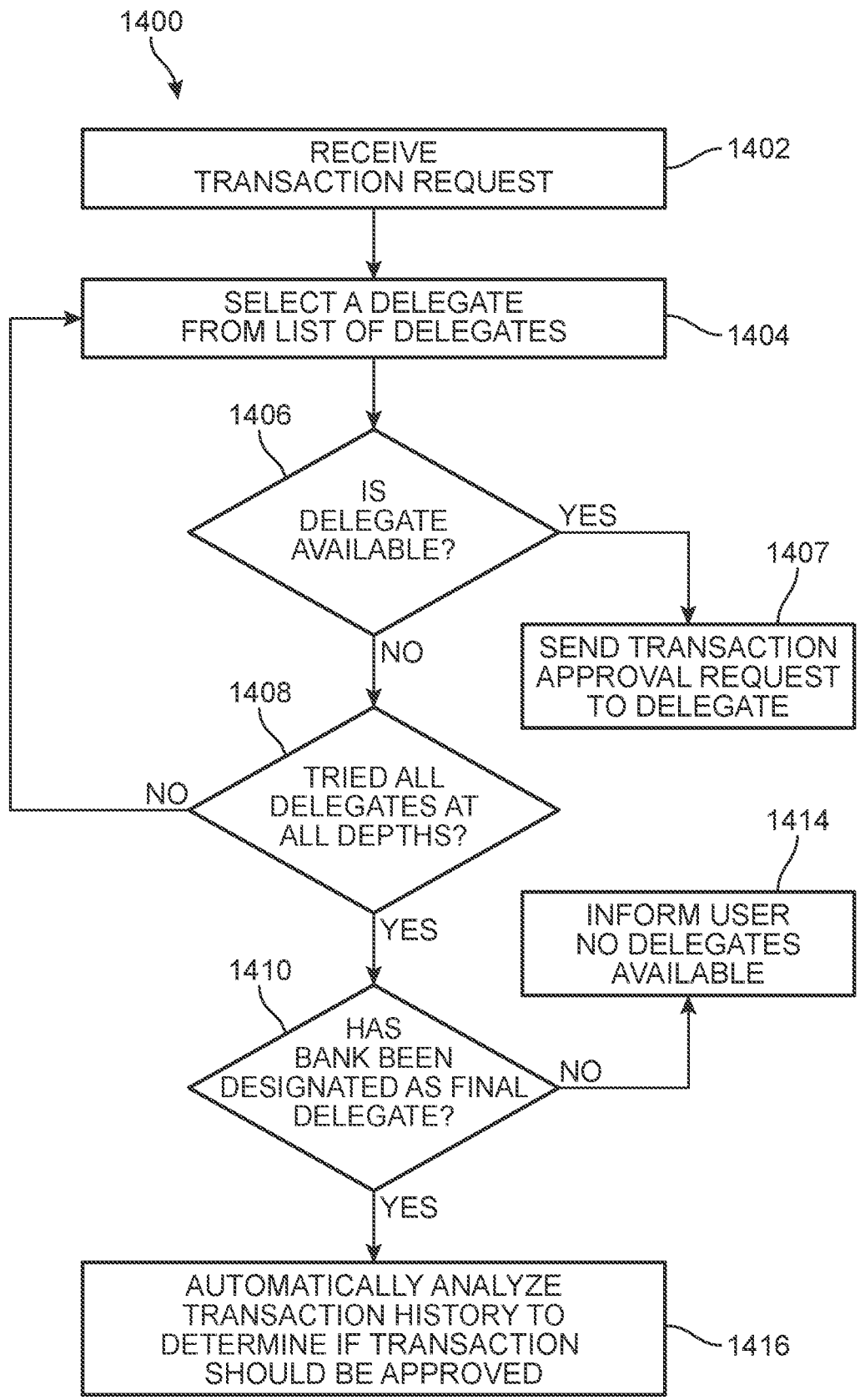
FIG. 14 is a schematic view of a process of selecting delegates for a fund approval request, according to an embodiment.

FIG. 14 is a schematic view of a process 1400 for dispatching transaction approval requests (such as fund withdrawals). One or more of the following steps may be performed by an account management service (for example, account management service 214). Starting in step 1402, service 214 may receive a transaction request from a secondary account holder. This request could be a request to withdrawal funds, a request to purchase an item using a particular card tied to a bank account, or any other suitable transaction request that is associated with the joint bank account shared by the secondary account holder and a primary account holder. In step 1404, in the situation where the primary account holder is unavailable, service 214 may select a delegate from a list of delegates. The list of delegates could be stored, for example, in primary user settings and preferences 224 (see FIG. 2) and/or in database 312 of enrollment module 290 (see FIG. 3).

In step 1406, service 214 determines if the delegate is available. This may be determined using delegate communication module 280 to send a preliminary message to the delegate. If the delegate is available, service 214 may send a transaction approval request to the available delegate in step 1407. Otherwise, service 214 may proceed to step 1408. In step 1408, service 214 checks if all delegates in the user's list have been tried. If not, service 214 returns to step 1404 to select another delegate. If all delegates have been tried in step 1408, service 214 proceeds to step 1410 to check if the bank (or other financial institution) has been designated as a final delegate. If not, service 214 proceeds to step 1414 to inform the secondary account holder that no delegates are available to approve the transaction.

If the bank has been designated as a final delegate in step 1410, service 214 proceeds to step 1416. In step 1416, service 214 may automatically analyze the transaction history associated with the account to determine if the transaction should be approved.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mobile computing device configured to:
receive a delegate enrollment initiation input from a primary user associated with the mobile computing device, the delegate enrollment initiation input including data descriptive of a intention by the primary user to enroll a new delegate for approving transactions that access funds held in a bank account that is associated with a secondary user;
display on a screen associated with the mobile computing device one or more delegate information prompts;
receive a new delegate information input, the new delegate information input including a phone number associated with the new delegate;
generate a message for the new delegate and display the message on the screen associated with the mobile computing device, wherein the message includes:
a name of the user;
an authentication token; and
an authenticating web address;
send the generated message to the new delegate using a messaging service;
enroll the new delegate so that the new delegate can manage access to funds held in the bank account associated with the secondary user;
determine a relational depth for the new delegate, the relational depth being a measure of interpersonal relationship distance between either the primary account holder or the secondary user and the new delegate; and
suggesting that the primary user add at least one additional delegate based on the relational depth of the new delegate; thereby improving a probability that the transaction will be approved if the new delegate is unavailable and the transaction must be approved by one or more of the additional delegates.

2. The mobile computing device of claim 1, wherein mobile computing device is further configured to:
receive an input from the primary user setting one or more delegate approval policies, the delegate approval policies including rules regarding what transactions the delegate is allowed to approve.

3. The mobile computing device of claim 1, wherein the mobile computing device is further configured to:
receive an input from the primary user setting one or more spending policies, the spending policies including rules regarding what may or may not be purchased by the secondary user in the transaction that accesses funds held in the bank account associated with the secondary user.

4. The mobile computing device of claim 1, wherein the messaging service is a short messaging service and the message is a text message.

5. The mobile computing device of claim 1, wherein the mobile computing device is further configured to:
prompt the primary user to add a financial institution associated with the bank account as a delegate.

6. A mobile computing device configured to:
receive a delegate enrollment initiation input via a touchscreen associated with the mobile computing device from a primary user associated with the mobile computing device, the delegate enrollment initiation input including data descriptive of a intention by the primary user to enroll a new delegate for approving transactions that access funds held in a bank account that is associated with a secondary user;
display on the touchscreen associated with the mobile computing device one or more delegate information prompts;
receive a new delegate information input via the touchscreen, the new delegate information input including contact information for the new delegate;
automatically generate a message for the new delegate and send the message to the new delegate using the contact information, wherein the message includes a request to provide identification information;
receive identification information from the new delegate;
determine a relational depth for the new delegate, the relational depth being a measure of interpersonal relationship distance between the primary account holder and the new delegate;
suggest that the primary user add at least one additional delegate having a different relational depth as the new delegate, thereby improving a probability that the transaction will be approved if the new delegate is unavailable and the transaction must be approved by one or more of the additional delegates; and enroll the new delegate so that the new delegate can manage access to funds held in the bank account associated with the secondary user.

7. The mobile computing device of claim 6, wherein the mobile computing device is further configured to:

determine an authorization level based on a delegate approval policy inputted by the primary user, the authorization level being associated with a maximum transaction dollar amount that can be approved by the new delegate; and a type of identification information requested in the message depends on the authorization level.

8. The mobile computing device of claim 6, wherein the message includes a request to provide identification information in the form of a photo ID, and the identification information received from the new delegate includes a copy of a photo ID.

9. The mobile computing device of claim 6, wherein the message includes a request to provide identification information in the form of a photo of the new delegate, and the identification information received from the new delegate includes a photo of the new delegate.

10. The mobile computing device of claim 6, where the message includes a request to provide identification information in the form of a three-way call with the user and a representative of an institution holding the bank account.

11. The mobile computing device of claim 6, wherein the mobile computing device is further configured to:

prompt the primary user to add a financial institution associated with the bank account as an additional delegate.

12. A mobile computing device configured to:

receive a delegate enrollment initiation input via a touchscreen associated with the mobile computing device from a primary user associated with the mobile computing device, the delegate enrollment initiation input including data descriptive of a intention by the primary user to enroll a new delegate for approving transactions that access funds held in a bank account that is associated with a secondary user;

display on the touchscreen associated with the mobile computing device one or more delegate information prompts;

receive a new delegate information input via the touchscreen, the new delegate information input including contact information associated with the new delegate;

generate a message for the new delegate, wherein the message includes an enrollment link that can be used by the new delegate to sign up:

send the generated message to the new delegate using a messaging service;

receive a delegate relation input from the primary user, the delegate relation input including information descriptive of an interpersonal relationship between the primary user and the new delegate;

determine a relational depth for the new delegate based on the delegate relation input, the relational depth being a measure of interpersonal relationship distance between the primary account holder and the new delegate;

suggest that the primary user add at least one additional delegate having a different relational depth as the new delegate, thereby improving a probability that the transaction will be approved if the new delegate is unavailable and the transaction must be approved by one or more of the additional delegates; and enroll the new delegate so that the new delegate can manage access to funds held in the bank account associated with the secondary user.

13. The mobile computing device of claim 12, wherein the mobile computing device is further configured to:

receive an input from the primary user setting one or more delegate approval policies, the delegate approval policies including rules regarding what transactions the delegate is allowed to approve.

14. The mobile computing device of claim 12, wherein the mobile computing device is further configured to:

automatically approve or deny fund requests when no delegates are available, by a transaction history for the bank account to determine if a fund request should be approved or denied.

15. The mobile computing device of claim 12, wherein the messaging service is a short messaging service and the message is a text message.

16. The mobile computing device of claim 12, wherein the message further includes a request to provide identification information.

17. The mobile computing device of claim 12, wherein the mobile computing device is further configured to:

receive an input from the primary user setting one or more delegate approval policies, the delegate approval policies including rules regarding what transactions the delegate is allowed to approve; and receive an input from the primary user setting one or more spending policies, the spending policies including rules regarding what may or may not be purchased by the secondary user in the transaction that accesses funds held in the bank account associated with the secondary user.

18. The mobile computing device of claim 12, wherein:

the messaging service is a short messaging service and the message is a text message;

the message further includes a request to provide identification information; and the mobile computing device is further configured to receive the identification information from the new delegate in response to the text message.

19. The mobile computing device of claim 12, wherein the mobile computing device is further configured to:

prompt the primary user to add a financial institution associated with the bank account as a final delegate, the final delegate being in addition to the new delegate and the one or more additional delegates.

* * * * *